INVENTOR.
JAMES R. STARRETT
BY Tom Walker
Jerome P. Bloom
ATTORNEYS

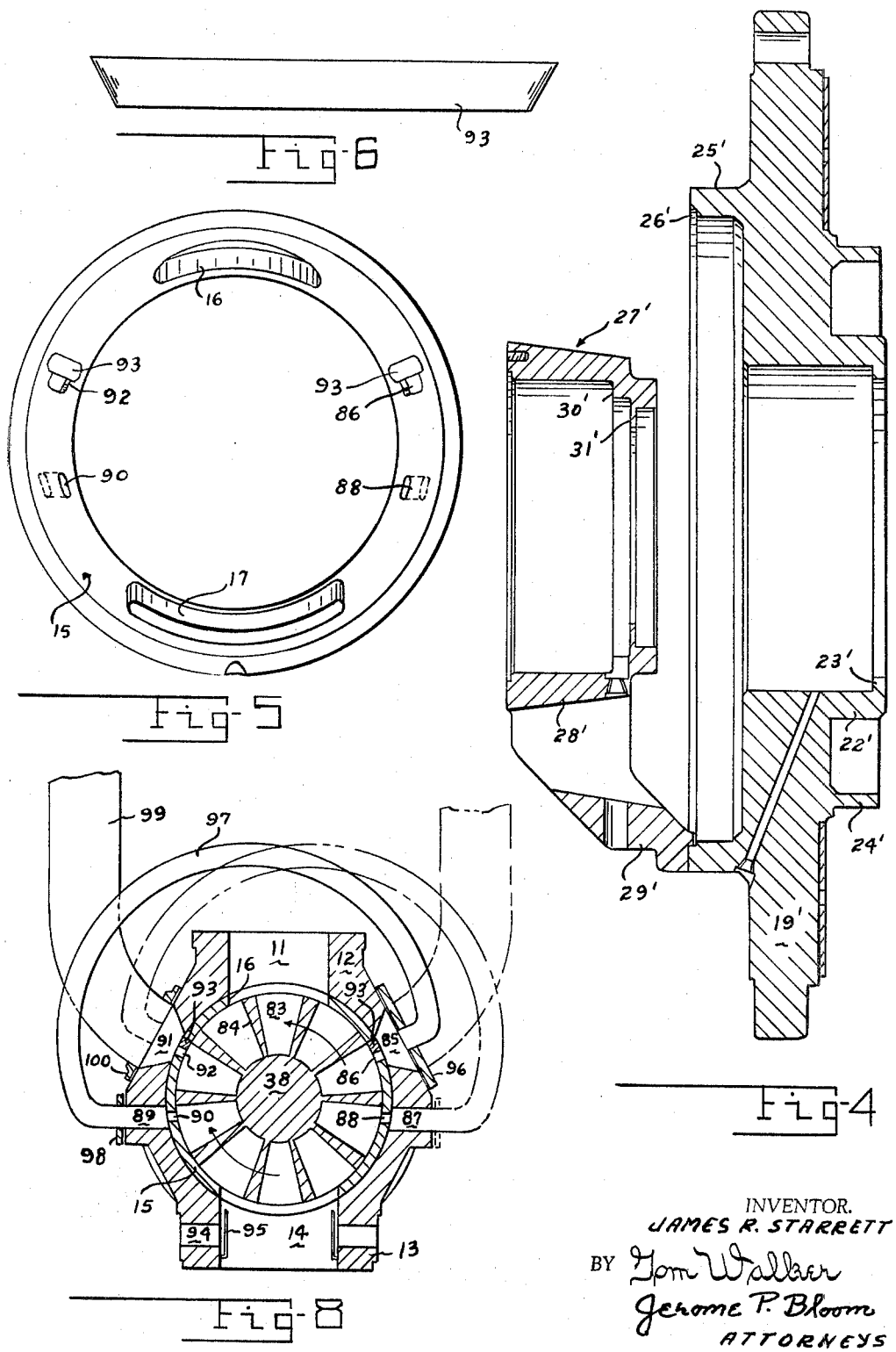

United States Patent Office 3,273,758
Patented Sept. 20, 1966

3,273,758
ROTARY VALVE
James R. Starrett, Springfield, Ohio, assignor to The Bauer Bros. Co., Springfield, Ohio, a corporation of Ohio
Filed Feb. 28, 1964, Ser. No. 348,157
15 Claims. (Cl. 222—194)

This invention relates to improvements in the construction of material handling valves of a rotary type. Embodiments thereof have particular utility in application to the pulp refining art and will be so described. However, it should be obvious that its application is not so limited and such is not intended.

A primary object of the invention is to provide improvements in the construction of material handling valves rendering such valves more economical to fabricate, more efficient and satisfactory in use, adaptable to a great variety of applications and unlikely to malfunction.

Another object of the invention is to provide a rotary valve unit the construction of which facilitates the application and removal of its rotor.

A further object of the invention is to provide a rotary valve unit having simplified means for adjustment of its rotor.

An additional object of the invention is to provide an improved rotary valve unit which is uniquely constructed to offer optimum protection for its rotor bearings.

Another object of the invention is to provide improvements in the design of rotary valve housings.

A further object of the invention is to provide a simple rotary valve unit having particular utility in the material handling art incorporating a reversible rotor.

Another object of the invention is to provide improvements in material handling valves of the type utilized in pulp refining systems to pass fluids and solids under conditions of elevated temperature and pressure.

An additional object of the invention is to provide means in conjunction with a rotary valve unit to minimize the incidence of unbalance in operation of the valve rotor.

A further object of the invention is to provide a rotary valve unit which is particularly advantageous for transferring fluids and solids under conditions of elevated temperature and pressure.

Another object of the invention is to provide a rotary valve with improved thermal stability.

Another object of the invention is to provide a rotary valve unit possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a longitudinal cross-sectional view of a rotary valve unit embodying the concepts of the present invention;

FIG. 4 is a detail view of a flange and connected bearing housing which forms a cap for one end of the valve unit of FIG. 1;

FIG. 5 illustrates a liner included in the valve housing;

FIG. 6 illustrates an insert utilized in conjunction with the liner of FIG. 5;

FIG. 7 is a fragmentary sectional view of the insert assembled in the liner; and FIG. 8 is a generally schematic cross-sectional view taken on line 8—8 of FIG. 1.

Like parts are indicated by similar characters of reference throughout the several views.

Figure 1:
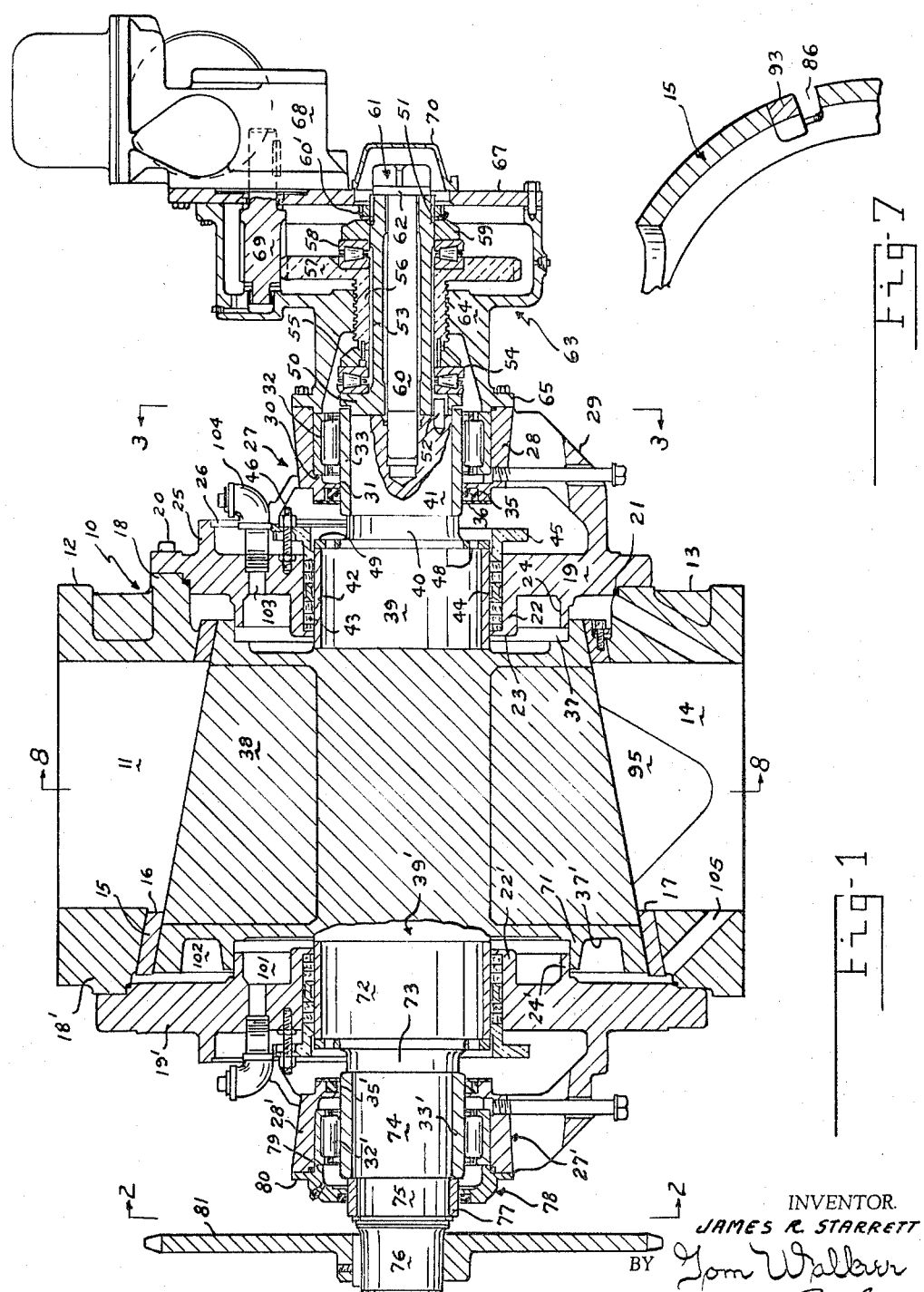
Figure 2:
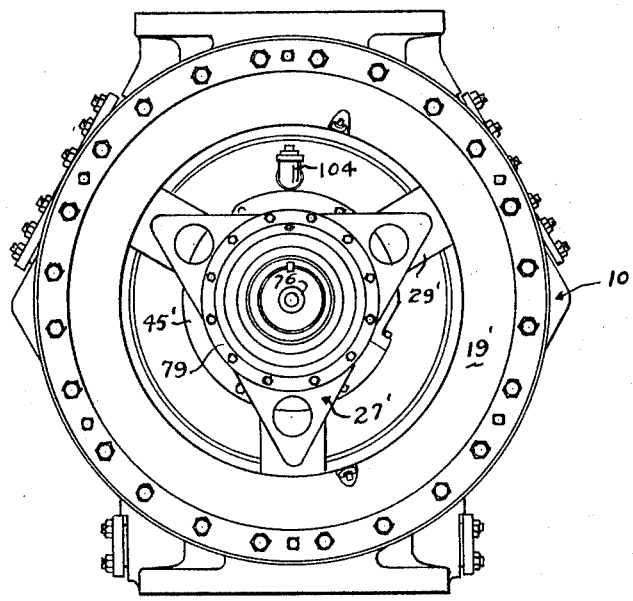
FIG. 2 is a view taken on line 2—2 of FIG. 1.
Figure 3:
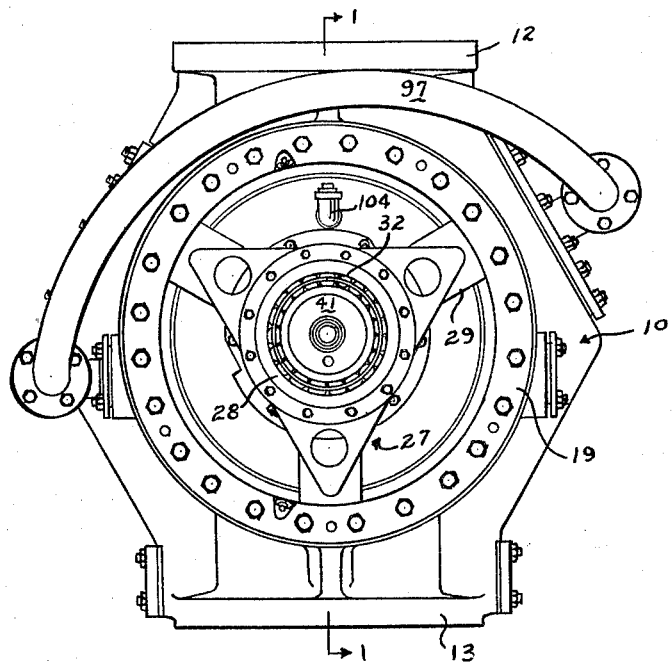
FIG. 3 is a view taken on line 3—3 of FIG. 1.

As seen in the accompanying drawings, the embodiment of the invention illustrated includes a generally frusto-conical shell 10 providing a convergent through passage open to either end. The shell 10 forms a portion of a valve housing having, at the top thereof, an inlet opening 11 defined by a tubular projection 12. Dependent from the bottom of the shell is a second tubular projection 13 defining a discharge opening 14. A liner element 15 is fixed coextensive with the inner surface of the shell 10 to have an opening 16 therein align with the inlet opening 11 and an opening 17 mate with the discharge opening 14.

The smallest end of the shell 10 includes, about the opening therethrough, a generally cylindrical projection 18 bridged at its projected extremity by a flange plate 19. The outer peripheral portion of the plate 19 is coextensive with the projected face of the projection 18 and fixed thereto by bolts 20. The projected face of the projection 18 is stepped at its inner periphery to provide a circular shoulder to seat an O-ring 21 confined thereto by a stepped portion of the plate 19 to form a seal therebetween.

The plate 19 has a generally annular configuration. Its inner periphery is defined by a cylindrical hub portion 22 which projects inwardly in the direction of the shell 10. Formed integral with the projected extremity of the hub 22, within the confines of one end of the shell 10, is an internal flange 23.

On the inner face thereof, the plate 19 includes a tubular projection 24 formed integral therewith and positioned in concentric spaced relation to the inwardly projected portion of its hub 22. On the outermost face of the plate 19, formed integral therewith, is a tubular projection 25 positioned in a sense radially outward of the projection 24. The projected face of the projection 25 has a recessed shoulder 26 at its inner periphery.

The projection 25 is bridged by a spider-like structure 27 the body of which is defined by a generally tubular element 28. The element 28 is displaced outwardly from the flange plate 19 and the projection 25 by three equidistantly spaced relatively divergent leg portions 29 formed integral therewith. The feet of the leg portions are stepped to seat to the shoulder 26 of the projection 25. So seated, the feet are welded in place.

At its end most adjacent the plate 19 and within the confines of the spider legs 29, the tubular element 28 has its inner wall formed to provide two steps 30 and 31. Nesting in the outermost end of the tube 28 to have one face abut the shoulder 30 is the outer race of a roller bearing unit 32. The inner race of bearing 32 includes at its inner periphery a tubular sleeve 33. The sleeve 33 while coextensive in length with the outer race projects there beyond to either end. Formed integral with the shoulder 31 is an inwardly projected flange element which seats a resilient ring 35 to the side thereof adjacent the shell 10. The ring 35 is thereby positioned about one end of sleeve 33. So seated, the ring 35 is confined by an annular plate 36 in such a manner to form a seal between the sleeve 33 and the inner end of the tubular element 28.

Nested in the shell 10 is a valve rotor 38 having a frusto-conical shape similar to that defined by the interior surface of the liner 15. Connected to form an integral part of the valve rotor 38 is a shaft means 39'. Respective end portions of shaft 39' project through the openings to either end of the shell 10 and, in the one instance, through the plate 19. In the assembled condition of the plate 19 the projection 24 thereof concentrically nests in a recess 37 formed in the smaller end of the adjacent valve rotor 38.

The portion of the rotor shaft structure which projects through the plate 19 includes successively reduced sections 39, 40 and 41. The section 39 projects through and, to either end, extends slightly beyond the hub 22. Mounting about and coextensive with the section 39 is a packing sleeve 42. Within the hub 22 the sleeve 42 mounts a series of circular glands 43 intermediately of which is positioned a lantern ring 44. The glands are confined to one end by the hub flange 23 and to their opposite end by a tubular packing follower 45. The follower 45 includes an external flange portion which positions outwardly of the plate 19. Fixed to the plate 19 are studs 46 which project therefrom and through apertures in the follower flange to mount threadedly engaged nuts which serve to abut the flange and thereby clamp the follower 45 in place.

The relative reduction in shaft size between the sections 39 and 40 forms a shoulder 48. Fixed to the shoulder 48 is an annular ring 49 the outer peripheral portion of which radially projects to contain the packing sleeve 42 in reference to the rotor 38.

One end of the sleeve 33 of the bearing unit 32 positions in abutment with the shoulder formed between the shaft sections 40 and 41. Its other end extends to form a cylindrical recess beyond the projected extremity of the shaft section 41. Nested in this recess is an annular projection formed on the relatively expanded base 50 of a tubular spindle 51. The spindle 51 extends coaxial to the valve rotor 38 and its projected shaft means. Its base includes a radially projected skirt portion which overlaps the projected extremity of the sleeve element 33 to fix its position in respect to the rotor shaft.

The spindle 51 is nonrotatively positioned in respect to the valve rotor by means of a dowel pin 52 projecting from the shaft section 41 through an aperture in its base.

From a point immediately adjacent and spaced from its base 50 to a point spaced outwardly therefrom, the spindle is externally and circumferentially recessed at 53. Fixed about the outermost surface of the radially projected skirt portion of the spindle 51 is a thrust bearing 54, one race of which encompasses the adjacent peripheral portion of the spindle to one end of the recess 53 and bears thereon. The other race of the thrust bearing 54 positions in concentric spaced relation to the portion of the spindle which defines the recess 53. In bearing abutment with this other race is a thrust plate 55 fixed at one end of the projected hub 56 of a gear 57.

The hub 56 positions in concentric spaced relation to the relatively reduced spindle portion 53. The face of the connected gear remote from the thrust plate 55 is recessed to nest one race of a second thrust bearing 58. The other race of bearing 58 seats on the outer end of spindle 51, beyond its reduced portion 53. Positioned about the spindle in abutment with the outermost side of the thrust bearing 58 is a thrust plate 59. The latter is contained to the bearing 58 by a lock washer and a lock nut 60' which threadedly engages about the outer end of the spindle.

The inner surface of the spindle is circumferentially recessed to provide, to either end thereof, a bearing portion which accommodates the body 60 of a bolt 61. The bolt 61 projects within the body of the spindle 51 to have its innermost end threadedly engage in the projected extremity of the rotor shaft section 41. The outermost end of the bolt includes a relatively expanded head which clamps a washer 62 against the outer end of the spindle.

The spindle 51 and the structure which mounts thereabout is housed within a generally tubular element 63.

Intermediate its extremities, the inner surface of housing 63 includes an annular hub portion 64 which is threadedly engaged by the projected hub portion 56 of the gear 57.

One end of the housing 63 nests within the outer end of the tubular element 28 to confine the outer race of the bearing 32 against the shoulder 30. This end of the housing 63 includes an external flange 65 which overlies and is bolted to the projected face of the tubular element 28. Conventional means afford a seal between the flange and the tubular element.

The portion of the housing 63 remote from the shell 10 is relatively expanded to accommodate the gear 57. Its outermost end terminates slightly beyond the gear, in a plane generally common to the outermost end of the spindle 51 and is capped by a releasable cover plate 67. To the outer side thereof, the plate 67 mounts a motor 68 the drive shaft of which is keyed to a pinion 69. The pinion 69 positions in the outer end of the housing 63 so as to have a driving engagement with the gear 57. Plate 67 has an aperture which accommodates the projection therethrough of the head of the bolt 61. This aperture is normally sealed by a cap 70.

Thus, the unit 32 which provides a bearing for the rotor shaft section 41 is displaced outwardly of the flange plate 19 and held remote therefrom in the body of the spider 27. One will also note that the flange plate 19 and its associated structure which encompasses the rotor shaft section 39 provides a fluid seal at one end of the shell 10. It is of significant importance that the seal provided about the rotor shaft section 39 positions in a sense radially outward in reference to the bearing unit 32. The significance of this will be further described.

The motor 68 has a reversible drive. On energizing the motor to drive in one sense, the pinion 69 drives the gear 57 to adjust its hub 56 in reference to the housing 63, and, through the medium of the bearing 58, the associated thrust plate 59, spindle 51 and bolt 61, draw the rotor unit 38 inwardly of the shell 10 and its liner 15. On energizing the motor to drive in an opposite sense, the hub 56 will apply a force through thrust plate 55, bearing 54 and spindle 51 to move the rotor 38 in a direction outwardly of the shell 10 and its liner 15. It is to be particularly noted that the rotor adjusting means is adjacent to and positioned outwardly of the smallest end of the shell 10.

The relatively larger opening to the opposite end of the shell 10, as limited by the liner 15, is rimmed by a cylindrical projection 18'. Fixed to bridge the projection 18' is an annular flange plate 19'. The plate 19' is larger, however its shape is identical to that of plate 19. Bridging the outer face of the plate 19' is a spider unit 27', the construction of which is identical to the construction of the spider 27. Accordingly, the component features of the plate 19' and the spider 27' are identified with numbers corresponding to those identifying similar features in reference to the plate 19 and spider unit 27.

The relatively larger end of the valve rotor 38 which positions adjacent the flange plate 19' has a recess 37', the base of which includes a tubular projection 71. The projection 71 concentrically nests the cylindrical projection 24' on the adjacent face of plate 19'. The plate hub 22' defines its central aperture which accommodates the projection therethrough of the rotor shaft means 39'. The end portion of the rotor shaft means 39' which projects through the hub 22' includes succesive sections 72, 73, 74, 75 and 76 which are successively reduced in cross-sectional dimension. The section 72 corresponds to the shaft section 39 at the relatively reduced end of the valve rotor 38. Sealing means interposed between the hub 22' and the rotor shaft section 72 are identical with those described with reference to the hub 22 and the shaft section 39.

The shaft section 74 which is spaced outward of the plate 19' by an intermediate shaft section 73 mounts a bearing unit 32' the structure of which is identical with that of the bearing 32 and similarly contained by the tubular element 28' of the spider unit 27'. Further, a sealing ring 35' provides a seal between the sleeve 33' and the inner end of the tubular element 28'. The bearing sleeve 33' is confined in reference to a shoulder formed between the shaft sections 73 and 74 by a packing sleeve 77 on the shaft section 75. The sleeve 77 mounts an annular cap 78 including a cylindrically projecting portion 79 which nests in the outer end of the tubular element 28' to contain the outer race of the bearing 32'. The cap 78 includes an external flange 80 which overlies the outer end of the tubular element 28' and is fixed thereto, a conventional sealing means being provided therebetween. A seal is also provided between the cap 78 and the packing sleeve 77 to thereby complete the sealed enclosure for the bearing unit 32'. The cap 78 includes conventional means for introducing hydraulic fluid in the area about the bearing 32'.

Fixed about the rotor shaft section 76 which is outermost in reference to the larger end of the shell 10 is a drive sprocket 81 the purpose of which shall be further described.

Referring particularly to FIG. 8 of the drawings, the schematic illustration therein reveals that the rotor 38 includes a series of circumferentially spaced peripheral pockets 83 which on energizing of the rotor will follow a circular path including the shell inlet 11 and the discharge opening 14. The pockets 83 are equidistantly spaced by vane type walls 84 which give the pockets an outwardly convergent form. A clockwise movement of the rotor, as shown, will cause a pocket 83, at a short distance following its communication with the inlet 11, to communicate with an outwardly divergent opening 85 in the wall of the shell through the medium of an aperture 86 in the liner 15. On further movement of the pocket in the direction of the discharge opening 14, it aligns with a cylindrical opening 87 in the shell 10 and communicates therewith through the medium of a liner opening 88. Immediately thereafter the pocket 83 will come into alignment with the discharge opening 14 and, shortly thereafter, communicate with a cylindrical shell opening 89 through a relatively smaller liner opening 90. Following this, the pocket will move to align with a shell opening 91 similar to the opening 85. This last communication is enabled by a liner opening 92 which is identical to the liner opening 86. Incorporated in the liner 15 to define the edge of each of the apertures 86 and 92 most adjacent the inlet opening 11 is a stainless steel insert 93, the purpose of which shall be further described.

Included in the tubular section 13 of the shell 10 which defines the discharge opening 14 are diametrically opposite steam inlet openings 94. Fixed on the inner surface of the tubular portion 13, in the path of flow from each of the passages 94 is a deflector shield 95. The shield 95 is arranged to divert the flow from the adjacent passage 94 upwardly in the direction of the rotor pockets which move past the discharge opening 14.

In the normal clockwise rotation of the rotor 38, the liner opening 88 and the shell opening 87 are normally sealed. Further, a plate unit 96 which overlies the shell opening 85 provides a relatively small inlet opening having engaged therein one end of an exhaust conduit 97. The other end of the conduit 97 is fixed by a plate 98 to communicate with the shell opening 89. Also included in connection with the shell 10 is an exhaust conduit 99 one end of which is fixed by a plate 100 to define the outlet from the shell opening 91.

In the event the rotor should be driven in a counter clockwise direction, the shell and liner openings 89 and 90 are then sealed in lieu of the openings 87 and 88. The conduit 99 is then transferred to define the outlet from the shell opening 85 while the conduit 97 is interconnected between the shell openings 87 and 91 in a manner believed readily apparent from FIG. 8 of the drawings.

Referring to FIG. 1 of the drawings, it may be seen that the flange plates to either end of the shell 10, in combination with the respectively adjacent ends of the rotor 38, form a first annular recess 101 which is innermost and a second annular recess 102 which is outermost with reference to the rotor shaft. These recesses interconnect by a small annular space defined between the relatively concentrically nested portions of the flange plates and the adjacent ends of the valve rotor which have been previously described. Each of the flange plates has an aperture 103, one end of which opens to a recess 101 and the other end of which nests a connector 104 arranged to couple with the delivery end of a steam conduit. Thus, steam may be flowed to the recesses 101 under pressure and induced thereby to move to the recesses 102 and to discharge from the recesses 102 through passages 105 in the tubular section 13 to mingle with the discharge from the valve housing. This steam provides fluid pressure to inhibit leakage to either end of the valve rotor. In the event some materials do leak, the continuous pressured flow of steam to the recesses 102 induces a scavenging of the leakage materials through the passages 105 in a manner believed obvious. It should be noted that the throttled orifice produced between the projection 71 and the projection 24' at the larger diameter end of the rotor and between the rotor and projection 24 to its smaller end, is such to prevent foreign material from entering zones 101 by reason of the small clearance provided by this orifice as well as fluid flow in the opposite direction.

This type of purge just described has a threefold value as follows: (1) It balances the axial loads induced by purge fluid pressure; (2) It reduces thermal contraction of the rotor ends which is normally caused in the handling of cold raw material; and (3) It keeps surrounding surfaces clean to permit better thermal conductivity and to keep abrasive raw material out of the sealing elements 43.

The embodiment of the invention above described provides for drive of the rotor 38 through the medium of the sprocket 81. Considering a clockwise rotation of the rotor, as seen in FIG. 8, a pocket 83 receives a charge of material as it first aligns with the inlet opening 11 in the shell 10. It is important to note that at the time the rotor is energized steam is caused to flow through the appropriate opening 94 and be deflected by a shield 95 to each pocket that communicates with the discharge opening 14. Thus, as a pocket moves from the discharge opening to communicate with the liner opening 90 immediately thereafter, the pocket will inherently include a charge of steam under pressure. Immediately following its communication with the inlet opening, the pocket 83 will come into communication with the liner opening 86 and thereby with the conduit 97. As this occurs, steam, which will partially inherently exhaust from a pocket as it passes the liner opening 90, will flow from the conduit 97 to place the charge in the pocket 83 under pressure. As the rotor movement continues to carry this pocket 83 to the discharge opening, this pressure is maintained to assist in inducing a discharge of the material from the pocket as it aligns with the discharge opening 14. As the pocket arrives at discharge opening 14, the pressured material will release from the pocket and the pocket will be scavenged as it moves past the far end of the discharge opening by steam which is effectively deflected by a shield 95 to move upwardly of the pocket and scour its walls. In this manner remaining materials are scavenged from the pocket. This, however, leaves a charge of steam under pressure in the pocket. As the pocket communicates with the liner opening 90, this pressure is partially relieved by a portion thereof flowing through the conduit 97 to pressurize a charge in the pocket then communicating with the liner opening 86. The steam is completely discharged from the pocket 83 as it comes into communication with the liner opening 92. In this instance, the steam rushes out in a highly accelerated condition induced by the size of the orifice 92. As the steam passes the orifice it expands in the shell opening 91 and exhausts through the conduit 99, either to the atmosphere or a steam condensing device as need may require. The stainless steel insert 93 at the upper edge of the orifice 92 functions to inhibit the occurrence of wire drawing and thereby prevents deterioration of the liner. The pocket, now relieved of pressure, may then approach the inlet 11 for another charge.

It will be obvious that the rotor may function in a reverse direction with appropriate plumbing changes as previously described. This reversibility of the valve rotor and the associated structure may be readily effected and enables the achievement of a longer and more efficient operating life for the rotary valve. It is particularly advantageous in reference to the liner, the valve partitions and the steam exhaust parts.

The invention system as above described utilizes potential exhaust steam in a simple yet very effective manner for insuring a proper discharge from the valve pockets when they achieve an alignment with the opening 14. It also provides a system having a pressure balance placing the rotor under minimal stress and enables thereby a high valve efficiency. A further feature to be noted is that the primary exhaust to a pocket 83 by way of conduit 97 increases the temperature of the pocket and its contents. In the process the transferred exhaust steam also heats the entire cold or down side of the liner 15 and shell 10 from opening 11 to opening 14. This substantially eliminates the possibility of distortion of parts normally caused by thermal expansion of one side of the rotor as compared to the opposite side. It can be readily seen that without the primary exhaust condition, one side of the shell 10 would be at a considerably higher temperature than the opposite side. Thus, movement of the primary exhaust steam decreases the temperature on the normally hot side and specifically increases the temperature, in a controlled fashion, on the normally cold side of the rotor.

As a matter of fact the basic construction of the rotary valve in accordance with the present invention affords many additional significant features. Note that on disconnection of the flange plate 19' from the cylindrical projection 18' on the shell 10 and separation of the bolt 61 from the rotor shaft section 41, following removal of the cap 70, the valve rotor 38 is completely free for a sliding displacement from the shell 10. This freedom is achieved without any effect thereby on the rotor adjusting mechanism. Accordingly, the rotor may be readily replaced and thereby caused to assume the setting dictated by the condition of the adjusting mechanism. In any event, when a rotor adjustment is required it may be effected in a very simple fashion as previously described.

In the conventional use of the rotary valve unit in a pulp refining system, the flange plates and their associated seal structures to either end of the valve rotor are constantly under the influence of steam and possibly other heated fluids that may be carried by the pockets 83 in the valve housing. In utilizing the unique spider-type structures for mounting the rotor bearings, the invention provides for the expansion and deflection of the flange plates per se relatively independent of the bearing supports, producing thereby less influence on the bearings and insuring a generally balanced radial expansion and deformation by pressure of the flange plates. Note that elements 25 and 25' will flex with the respective flange plates but will not react with the spiders 27 per se. In this manner, the invention achieves more central location of and more accurate and constant balance for the valve rotor. This is of significant importance in providing rotor sealing efficiency and prolonging the operating life of a rotary valve unit having the application described.

A further construction feature of the invention is the provision for the drive sprocket 81 at the large end of the rotor. This tends to lessen the possibility of rotor distortion by torsion forces which inherently exist in the rotor operation. This feature produces an advantage not heretofore obvious.

Thus, the invention provides an improved rotary valve housing offering features enabling a higher and more constant efficiency in the operation of a rotary valve unit. It facilitates maintenance procedures and minimizes the incidence of part replacement. Further, the invention, by means of a simple utilization of exhaust pressure, renders a rotary valve more economical to operate and more efficient and satisfactory in use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A material handling valve comprising a shell forming a tapered passage opening from either end of said shell, a mating tapered rotor housed in such shell, shaft means projecting relative either end of said rotor, means anchored to one end of said shell forming a seal about the projected end of said shaft means adjacent the rotor portion of minimal cross-sectional dimension, means forming an axial extension of the end of said shaft which projects relative said seal, means indexing said extension to said shaft accommodating their relative axial displacement but preventing their relative rotation, a single accessible element engaging to said shaft and holding said axial extension from axial displacement relative to said shaft, means rotatably mounting about said axial extension and contained against endwise movement relative thereto, and relatively fixed nut-like means in connection with said sealing means threadedly related to the means about said axial extension whereby on rotation of said latter means there is produced thereby an axial movement of said axial extension and said shaft due to the containment of said extension to said shaft by said single element and means forming a seal about the opposite extremity of said shaft means forming a closure element for asid shell which on release thereof and release of the single element said shaft means forming a closure element for said shell without disturbing the first mentioned sealing means or said axial extension.

2. A rotary value including, a frusto-conical rotor, a shell housing said rotor having a mating interior surface, said shell being open to either end of said rotor, shaft means projecting from either end of said rotor and through the respective openings in said shell, means capping the opening in said shell to either end of said rotor forming a seal about said shaft means, means anchored to a portion of said sealing means respectively to either end of said shell including housing elements displaced outwardly from said sealing means and bearings for said shaft means positioned in each of said relatively displaced housing elements, and means forming an extension of a displaced housing element adjacent the smallest end of said rotor, a tubular spindle element forming an extension of said rotor shaft means within said housing extension, a bolt element anchoring to said rotor shaft means through said tubular spindle, said bolt element having the head thereof confining said spindle element to said shaft means, and means mounted about said spindle element within said housing extension and interrelated to said housing extension to provide on adjustment thereof in reference to said housing extension an adjustment of said rotor in said shell.

3. A rotary valve as set forth in claim 2 characterized by said shell sealing means to either end of said rotor being in axial alignment with the adjacent bearings and positioned in a sense radially outward therefrom to inhibit any leakage past said sealing means from reaching said bearing means.

4. A material handling valve comprising, a housing, a rotor confined for rotation in said housing, said housing having an inlet opening, an outlet opening and at least two additional openings, one immediately following said inlet and the other immediately following said outlet, conduit means interconnecting said additional openings, said rotor having a series of pockets which on drive thereof successively communicate with each of said openings, and means at said outlet opening independent of discharge pressure for applying a charge of fluid under pressure to scavenge each of said pockets as it moves thereby, as a result of which each pocket carries therewith a charge of fluid under pressure as it moves beyond said outlet, whereby on said pockets communicating with said opening immediately following said outlet, said conduit means provides for a portion of said fluid under pressure to move between said additional openings to pressurize other pockets as they communicate with said opening immediately following said inlet.

5. A material handling valve as in claim 4 characterized by said housing having means defining an additional opening immediately preceding said inlet, said pockets being arranged to successively communicate therewith to exhaust the remaining fluid contained thereby under pressure prior to communication thereof with said inlet.

6. The structure as set forth in claim 5 characterized by said rotor having a reversible drive and means defining additional openings in said housing adapted for communication with said rotor pockets on drive thereof, one of said additional openings occurring immediately preceding said outlet and the other immediately preceding said inlet, said conduit means optionally serving to interconnect said additional openings and to provide thereby means to enable said valve means to similarly function on a reverse drive of said rotor.

7. The structure as set forth in claim 6 characterized by additional conduit means interconnecting with said housing to have one end thereof about either the opening immediately preceding or the opening immediately following said inlet, dependent on the direction of the rotor drive, said last mentioned conduit means providing for exhaust of said pockets prior to communication thereof with said inlet opening.

8. The structure as set forth in claim 7 wherein the means defining each of said openings in said housing immediately preceding or following said inlet opening incorporates means to inhibit the effects thereon of wire drawing.

9. A material handling valve including an outer shell, a liner for said outer shell, a rotor confined by said liner, means defining stations affording openings in said shell and liner in spaced locations about said rotor, said rotor having pockets which on drive thereof successively communicate with the openings at each of said stations, one of said stations being an input station for delivering material to each of said pockets on communication therewith, another of said stations being an output station for discharge of the material in said pockets and means at said output station independent of discharge pressure at said output station for scavenging said pockets as they move thereby and leaving therein a charge of fluid under pressure and means for inducing a transfer of a portion of said charge of fluid under pressure as each of said pockets leave said output station and applying it to pressurize materials in the other pockets as said other pockets leave said input station.

10. A valve as set forth in claim 9 characterized by said rotor and said liner providing means for maintaining the pressurized condition of the materials in each of said pockets between the time of pressurizing thereof and communication with said output station and means providing an exhaust conduit at another of said stations immediately preceding said outlet.

11. A valve as set forth in claim 10 wherein said aligned openings in said liner and said shell at said exhaust conduit are of different size and configuration, the opening in said liner being small and the opening in said shell relatively expanding, the means defining the opening in said liner including an insert of a character to inhibit wire drawing.

12. A material handling valve including an outer shell, a rotor confined by said shell, means defining stations affording openings in said shell in spaced locations about said rotor, said rotor having pockets which on drive thereof successively communicate with the openings at each of said stations, one of said stations being an input station for delivering material to each of said pockets on communication therewith, another of said stations being an output station for discharge of the material in said pockets, means at said output station independent of discharge pressure at said output station for scavenging said pockets as they move thereby and leaving therein a charge of fluid under pressure, means for inducing a transfer of a portion of said charge of fluid under pressure as each of said pockets leave said discharge station and applying it to pressurize materials in other pockets as said other pockets leave said input station, said rotor being reversible as to its drive and said stations being interchangeable so as to function in a manner which is dependent on the direction of the drive of said rotor.

13. A rotary valve comprising a housing, a rotor confined for rotation in said housing, said housing having an inlet opening and an outlet opening, said rotor having a series of pockets successively communicating with each of said openings, means at said outlet opening independent of discharge pressure at said outlet opening for applying a charge of steam under pressure to scavenge each pocket as it moves thereby, as a result of which each pocket carries therewith a charge of steam under pressure as it moves past said outlet opening and means communicating with each of said pockets as they leave the outlet opening with a charge of steam under pressure to transfer a portion of said steam under pressure to another pocket or pockets leaving said inlet opening whereby to provide a balanced heating of said housing to either side of said inlet and said outlet openings.

14. A material handling valve, including a shell, a rotor in said shell, said shell having an opening to at least one end of said rotor, a shaft connected to said rotor and extended from said shell through said one open end thereof, plate means mounted in closing relation to said one open end of said shell, said plate means having an opening accommodating the projection therethrough of said shaft, sealing means for said opening above said shaft, means in connection with said plate means projecting outwardly to terminate in a bearing housing for said shaft which is displaced outwardly from said shell, a housing element fixed to extend longitudinally in a sense outwardly from said bearing housing incorporating therein a nut-like device and contained thereby and threadedly related thereto a rotatable sleeve, means in connection with said sleeve for rotation thereof, means confining said sleeve against movement in a sense axially of said shaft, said last named means being contained for movement with said shaft whereby on rotation of said sleeve there occurs an axial adjustment of said shaft and the connected rotor.

15. A valve according to claim 14 characterized by the containing means for said confining means including a bolt passed longitudinally therethrough to have its head end engage the outer end of the confining means and its other end engage with the projected end of said shaft.

References Cited by the Examiner

UNITED STATES PATENTS

| | | | |
|---|---|---|---|
| 2,594,974 | 4/1952 | Mylting. | |
| 2,766,911 | 10/1956 | Greaves, et al. | 222—368 X |
| 2,858,212 | 10/1958 | Durant et al. | 222—368 X |
| 2,960,245 | 11/1960 | Knapp | 214—17.68 |
| 3,052,383 | 9/1962 | Transeau | 222—368 X |
| 3,077,272 | 2/1963 | Reinhall | 222—368 X |
| 3,097,767 | 7/1963 | Wirt | 222—368 |
| 3,101,853 | 8/1963 | Long et al. | 214—17.68 |
| 3,130,879 | 4/1964 | Messing | 222—368 |
| 3,151,784 | 10/1964 | Tailor | 222—368 |

FOREIGN PATENTS 503,710  4/1939  Great Britain.

ROBERT B. REEVES, *Primary Examiner.*

LOUIS J. DEMBO, RAPHAEL M. LUPO, *Examiners.*

H. S. LANE, *Assistant Examiner.*